United States Patent [19]
Berg

[11] Patent Number: 5,839,242
[45] Date of Patent: Nov. 24, 1998

[54] COMBINED UTILITY TRENCH METHOD

[75] Inventor: Timothy P. Berg, Reno, Nev.

[73] Assignee: Sierra Pacific Resources, Inc., Reno, Nev.

[21] Appl. No.: 972,082

[22] Filed: Nov. 17, 1997

[51] Int. Cl.⁶ ............................................. E04G 21/00
[52] U.S. Cl. ............................. 52/741.11; 405/157
[58] Field of Search ................ 52/741.11; 405/157, 405/174, 178, 179, 159

[56] References Cited

U.S. PATENT DOCUMENTS

| | | | |
|---|---|---|---|
| 3,115,861 | 12/1963 | Allen | 405/157 |
| 3,582,533 | 6/1971 | Albright | 405/157 X |

Primary Examiner—Creighton Smith
Attorney, Agent, or Firm—Welsh & Katz, Ltd.

[57] ABSTRACT

A method for installing a plurality of utility lines from a plurality of utility distribution sources to and end user includes excavating a single trench from a common location at about the utility distribution sources. The trench is excavated between about 66 and 48 inches deep and about 24 inches wide. A plurality of utility lines are positioned in the single trench, wherein an electrical utility line, if installed, is at a lowest elevation in the trench. A water line, if installed in the trench, is at an intermediate elevation therein, and a gas line, if installed, is at an uppermost elevation in the trench. A single partitioned service box is installed in the trench through which the utility lines can be accessed. The utility lines are buried with appropriate fill.

12 Claims, 1 Drawing Sheet

COMBINED UTILITY TRENCH METHOD

FIELD OF THE INVENTION

This invention pertains to a method for installing multiple utility service lines in a single trench. More particularly, this invention pertains to a method for installing gas, water, electrical and communication utility lines in a single trench from a variety of utility source lines to one or more commercial or residential structures.

BACKGROUND OF THE INVENTION

Trenching and the installation of piping for carrying water dates back at least as far as the Roman Empire. Those familiar with the more modern approaches to trenching and utility line installation will recognize that often in the creation of a residential or commercial development area, the installation of utility lines, such as electrical, water, gas and telecommunications services can be a considerable portion of the overall development cost.

Numerous methods and devices have come into use for installing utility lines. In one known method, a tunnel or like enclosure is built under the ground, and one or more utility lines are installed in the tunnel. It will be apparent that such a method for installing utility lines can be rather costly given the nature of the excavation necessary and subsequent tunnel construction. In addition, when branch lines are required from the main utility or service lines, a plurality of tunnels must be installed that interconnect with the main tunnel.

One known device for installing incompatable utility lines includes a modular or sectional arrangement of precast elements having dividers or walls to segregate specific compartments for the utility lines. Such an arrangement may include junction boxes, also having segregated compartments for accommodating utility line branch or distribution points. This arrangement includes a plurality of cover sections positioned over the precast modules to maintain segregation between the compartments.

It will be apparent to those skilled in the art that while such an arrangement may accommodate the contemporaneous installation of incompatible utility lines, there are a number of drawbacks to such a utility line installation arrangement. First, in order to assure that shifting or jarring of the modular sections does not affect the integrity of the utility lines, such modular sections may be required to be fixed or pinned to the earth in which they are installed. Such installation requirements can greatly increase the cost of installing the utility services.

In addition, such a modular configuration may require the manufacture of a significant number of different modules or sections in order to accommodate, for example, the contemporaneous installation of two, three or more utility service lines. Further, the requirement for branching or distributing the utility services in a number of different directions may also increase the requirement for the manufacture of additional configurations or designs of distribution boxes.

Other utility system installation methods and devices include installing piping or conduit within precast, for example, concrete sections. However, as will be apparent, a large variety of differing sections may be necessary in order to accommodate the desired variety of utility service layout arrangements.

In one known method for providing utility services to various residential structures, three separate trenches are required. Water service is installed in one trench, separate from gas, electric or telecommunications. Another trench provides gas service, and a third provides electric and telecommunications services. Typically, the compaction and backfill guidelines require individual compaction and backfill steps for each water trench, and three compaction and backfill steps for the gas, electric and telecommunications trenches. As will be recognized, these compaction and backfill requirements can be time consuming and considerably costly.

Accordingly, there continues to be a need for a method for readily installing a plurality of different utility services, such as electrical, water, gas and telephone/telecommunications services within a single trench, which method is readily adaptable to accommodate most any commercial or residential development plan.

SUMMARY OF THE INVENTION

A method for installing a plurality of utility lines from a plurality of utility distribution sources to an end user includes the steps of excavating a single trench from a common location at about the utility distribution sources. The trench is excavated to a depth between about 66 inches and about 48 inches, and has a width of about 24 inches. A plurality of utility lines are positioned in the single trench wherein an electrical utility line, if installed, is at a lowest elevation in the trench. A water line, if installed in the trench, is positioned above the electrical utility line, preferably about 12 inches above the electrical utility line.

A first intermediate fill layer is positioned between the electrical utility lines and the water utility lines. A second intermediate fill layer is positioned in the trench above the water utility lines, and a gas line, if installed in the trench, is positioned on top of the second intermediate fill layer. A third intermediate fill layer and final finish fill layer are positioned in the trench above the gas utility line if installed in the trench.

In a preferred method, a warning tape is positioned in the third intermediate fill layer about 12 inches above the gas utility line, if installed in the trench. Most preferably, a second warning tape is positioned in the trench at about the same elevation as the water service line, if installed in the trench.

In a preferred installation method, telecommunications, including telephone, voice, data and/or cable television lines are installed in the trench at about the same elevation as the electrical utility lines.

The method includes installing a single partitioned service box in the trench through which one or more of the utility lines are routed and can be accessed.

Other features and advantages of the present invention will be apparent from the following detailed description, the accompanying drawings, and the appended claims.

DETAILED DESCRIPTION OF THE PREFERRED EMBODIMENTS

Figure 1:
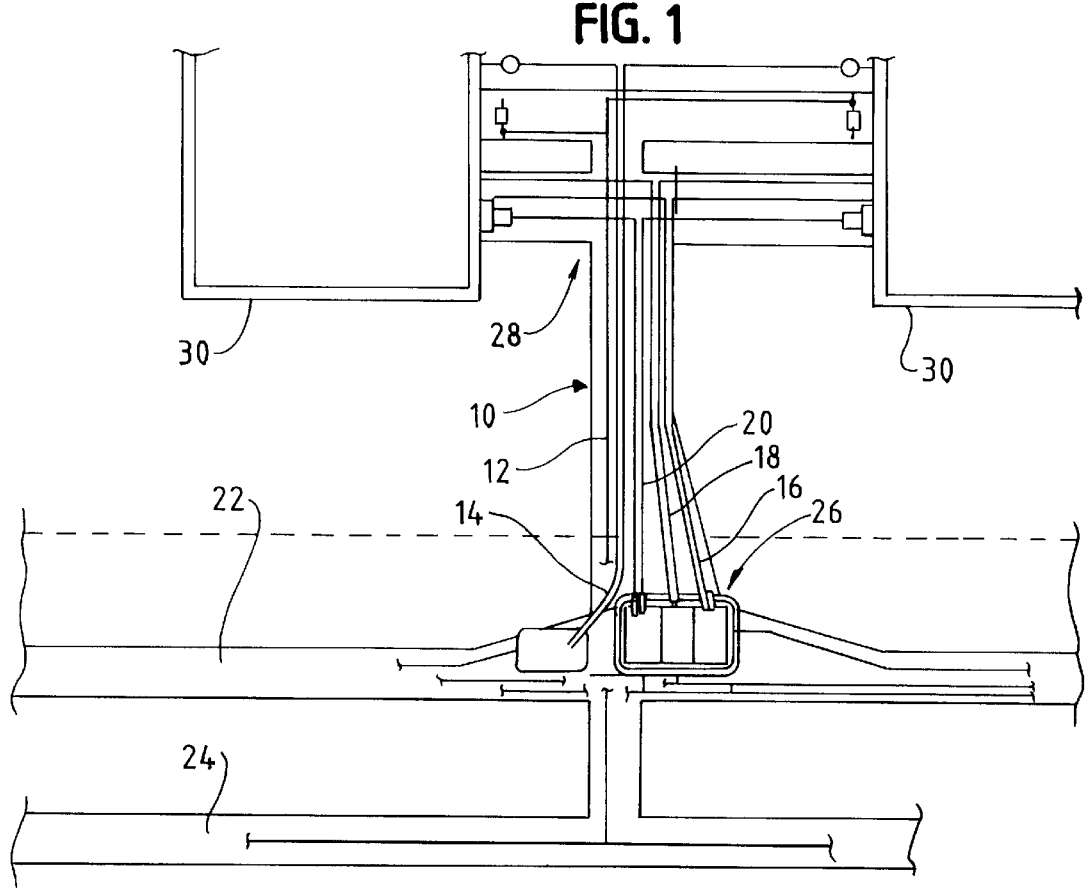
FIG. 1 is a layout view of a plurality of utility service lines routed from main utility trenches to two exemplary residential structures which service lines are installed in accordance with the principles of the present invention.

While the present invention is susceptible of embodiment in various forms, there is shown in the drawings, and will hereinafter be described, a presently preferred embodiment and method with the understanding that the present disclosure is to be considered an exemplification of the invention and is not intended to limit the invention to the specific embodiment illustrated and method described.

Referring now to the figures, and in particular to FIG. 1, there is shown a series of incompatible utility lines installed in a trench 10 in accordance with a preferred method of the present invention. The utility lines can include, but may not necessarily be limited to, one or more gas distribution lines 12, water distribution lines 14, cable television lines 16, telecommunications/telephone lines 18 and electrical or power lines 20. Those skilled in the art will recognize that any or all of these lines, as well as other utility services, may be necessary or desirable for installation within an area under development, or in an area that may be under re-development.

Figure 2:
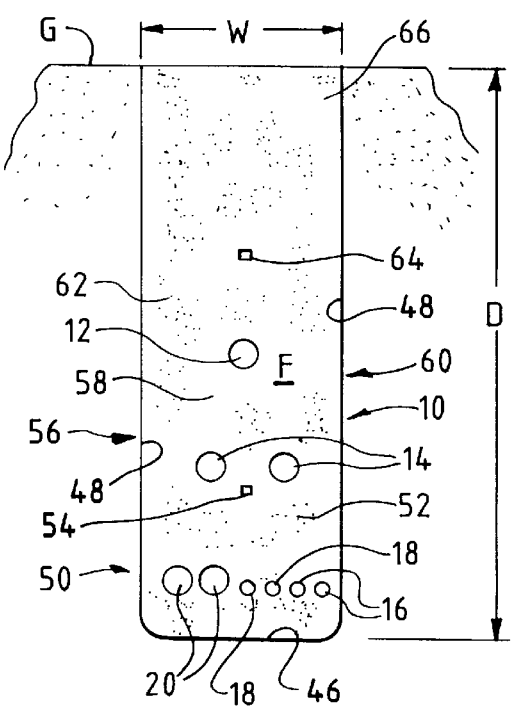
FIG. 2 is a cross-sectional view of an exemplary trench illustrating the placement or position of incompatible utility service lines relative to one another within the trench.
Figure 3:
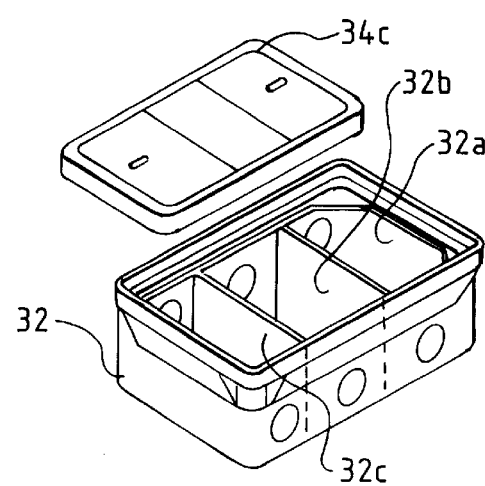
FIG. 3 is a perspective view of a partitioned or segregated service box and cover for use in carrying out the method of the present invention.

As can be seen from FIGS. 1 and 2, a common trench 10 is used to route the gas 12, water 14, electrical 20, telephone 18 and cable television lines 16 from a plurality of primary utility trenches 22, 24. The lines 12–20 are routed from the primary trenches 22, 24 to a receiving region 26 for the unitary trench 10. The lines 12–20 are routed through the trench 10 to a distribution point indicated at 28, for distributing the various service lines 12–20 to the two, exemplary residential structures 30. Those skilled in the art will recognize that the common trench 10 can be used to carry a single set of utility service lines, as well as more than one set of service lines, such as the illustrated two sets of utility service lines. Additionally, the "end user" as exemplified by the residential structures 30 can include any number of residential and/or commercial structures.

The method can include the installation of a distribution box, such as the exemplary box illustrated at 32, which can be used for routing one or more of the lines 12–20 therethrough. The distribution box 32 includes a cover 34 and a plurality of fully segregated compartments 32a–c for carrying the service lines 12–20 positioned therein. The cover 34 maintains segregation of the compartments 32a–c. It is presently contemplated that the box 32 will carry lines positioned in a common service line layer such as the electrical power lines 20, telecommunications/telephone lines 18, and cable television lines 16. Such a distribution box 32 can be used to provide access for maintenance and/or utility line shut-off. Accordingly, valves or other switches (not shown) can be positioned in the box 32 to permit service or maintenance personnel to terminate service from the main distribution lines or sources 36–44 to the various, individual structures 30.

In an exemplary trench 10 in accordance with the present method, all of the lines 12–20 are included within one trench 10 having a base or bottom 46, and generally vertically extending side walls 48. The trench 10 can be excavated to a depth of about 54 inches plus the outside diameter of the largest pipe or conduit installed in each layer of piping and conduit. Such an arrangement is illustrated in FIG. 2. In the illustrated trench, all of these lines can be installed in a single trench that has a width W of about 24 inches and an overall depth D of about 66 inches from the finish grade G. The additional 12 inches contemplates three layers of utility service lines, with each layer having a largest pipe or conduit outside diameter of four inches. The trench 10 dimensions further contemplate excavating about 6 inches below the depth of the first layer of utility service lines 50 so that the fill F can be placed into the trench 10 to assure that the fill F on which the first layer of lines 50 is positioned is flat or level, or pitched to a desired pitch angle.

The first, or deepest layer of utility service lines 50 can include one or more electrical or power lines 20, one or more telephone/telecommunications lines 18, as well as one or more cable television lines 16. The lines 16–20 are positioned on the bed of fill F, which can include material such as gravel, that is built up from the trench bottom 46 about 6 inches. The first layer of utility service lines 50 is then buried with approximately 12 inches of fill F extending upwardly from the top of the uppermost extending (e.g., largest diameter) conduit or pipe. That is, if the electrical conduit 20 is, for example, 4 inches in diameter, then fill F is positioned on top of the first layer of utility service lines 20, to a depth of about 12 inches above the electrical conduit 20. This is the first intermediate fill layer 52.

In a preferred arrangement, a warning tape 54 is positioned on top of the first intermediate fill layer 52, next to which one or more subsequent sets of utility service lines can be positioned. In one embodiment of the trench 10 carried out in accordance with a preferred method, one or more water lines 14 are positioned on top of the first intermediate fill layer 52 adjacent to the first warning tape 54. The water lines 14 are so positioned to defined a second layer of utility lines 56.

Additional fill F, or a second intermediate fill layer 58, is then placed over the second layer of utility service lines 56 essentially covering the lines, whether they be piping or conduit. In the illustrated trench 10, the second layer of utility service lines 56 includes a pair of water service lines 14. The second intermediate fill layer is positioned over the water service lines 14, extending about 12 inches upwardly from the top of the largest pipe or conduit in the second layer of lines 56. A gas service line 12, for example, can then be positioned in a third service line layer 60, on top of the second intermediate fill layer 58, as illustrated in FIG. 2. It will be recognized by those skilled in the art that a plurality of such gas service lines 12 can be positioned in this third layer of utility service lines 60. Fill F is then positioned in the trench on either side of the exemplary gas service line 12, covering the line. An additional, approximate 12 inches of fill F, or third intermediate fill layer 62, can then positioned in the trench 10 over the top of the gas service line or lines 12.

In order to provide a warning to indicate the presence of the buried lines 12–20, and to prevent inadvertent digging into the lines 12–20, a second warning tape 64 can be positioned about 12 inches above the top of the gas service lines 12 in the trench 10, on top of the third intermediate fill layer 62. After the warning tape 64 is positioned in the trench 10, the trench 10 can be completely filled up to finish grade G with a final or finish fill layer 66.

The present method for installing a plurality of incompatible utility lines 12–20 provides a number of advantages over known utility line installation methods and devices. First, as will be apparent, a common trench 10 for installation of all utilities can provide a considerable cost savings over known trenching methods. In addition, the present method provides a way in which such utility lines 12–20 can be installed without precast structures, while maintaining the necessary segregation between the lines, in accordance with most known codes and standards for installation of such lines.

In addition, the backfill and compaction requirements for the common trench 10, are significantly reduced over the known trenching methods. Because only a single trench 10 is required, and further because of the close proximity of the electrical lines 20, cable TV lines 16 and telecommunications/telephone lines 18, it has been found that the number of compaction and backfill steps can be reduced to three total steps. That is, because there is a single trench 10, rather than multiple trenches as is known in the art, compaction and backfill only needs to be carried out three times in order to properly fill and grade the trench 10.

Those skilled in the art will also recognize the general enhancement to safety that such a single common utility trench 10 can provide. Those who may have had occasion to dig in or about the earth adjacent to a residential home, will recognize that often, the utility lines are positioned at various, if not seemingly random, locations on the property. As such, while electrical lines may enter the property from one direction, water service may enter from yet another direction, gas service from still another direction, and telecommunications and/or cable television lines from still another direction. This can often result in difficulty identifying a clear path to dig, for example, fence posts for installing a fence, posts for installing a deck, or other structural members that may be required to be positioned at or below a required depth, such as a frost line, in the ground.

The present method alleviates many problems associated with identifying the various locations, entrance and exit points for the utility service lines. The present method concentrates the area in which all such lines 12–20 enter the property into a single location, through use of a single trench 10, that may be no more than about 24 inches in width. Again, those who may have had occasion to attempt to locate utility service lines on their property will recognize the ease and convenience with which these subterranean or buried lines can be avoided using the present method, and the ease with which structures such as fence posts can be installed.

It will be recognized by those skilled in the art that, although it may not be required, it may be highly desirable to put into force agreements between the various provides of the utility services. Such agreements can enhance, if not assure, personal safety when performing maintenance and other required services on the various service lines 12–20 in the combined trench 10 of the present invention.

From the foregoing it will be observed that numerous modifications and variations can be effectuated without departing from the true spirit and scope of the novel concepts of the present invention. It is to be understood that no limitation with respect to the specific embodiments illustrated and methods described is intended or should be inferred. The disclosure is intended to cover by the appended claims all such modifications as fall within the scope of the claims.

What is claimed is:

1. A method for installing a plurality of utility lines from a plurality of utility distribution sources to a user comprising the steps of:

excavating a single trench from a common location at about the utility distribution sources, the trench being between about 66 and about 48 inches deep and about 24 inches wide;

positioning the plurality of utility lines in the single trench, wherein an electrical utility line, installed, is at a lowest elevation in the trench which is a lower elevation in the trench than a water line in the trench, which is at an intermediate elevation in the trench which is at a lower elevation in the trench than a gas line;

installing a single partitioned service box through which at least one of the utility lines is accessible; and burying the plurality of utility lines.

2. The method for installing a plurality of utility lines in accordance with claim 1 including positioning the electrical utility line in the trench at the lowest elevation, positioning the water line at an elevation above the electrical utility line, and positioning the gas line in the trench above the water line.

3. The method for installing a plurality of utility lines in accordance with claim 1 including positioning a communication utility line in the trench at an elevation about equal with the electrical utility line.

4. The method for installing a plurality of utility lines in accordance with claim 3 including positioning the water line about equidistant between, and above, the electrical utility line and the communication utility line.

5. The method for installing a plurality of utility lines in accordance with claim 1 including positioning a plurality of each of the electrical utility lines being positioned at the same elevation, each of the water lines being positioned at the same elevation, and each of the gas lines being positioned at the same elevation.

6. The method for installing a plurality of utility lines in accordance with claim 5 including positioning a plurality of communication utility lines in the trench at an elevation about equal with the electrical utility lines.

7. The method for installing a plurality of utility lines in accordance with claim 1 including positioning a warning tape in the trench at an elevation about 12 inches above a gas line.

8. The method for installing a plurality of utility lines in accordance with claim 7 including positioning a second warning tape in the trench at about the same elevation as the water line.

9. The method for installing a plurality of utility lines in accordance with claim 1 including positioning at least 24 inches of fill above an uppermost elevation of an uppermost line installed in the trench.

10. The method for installing a plurality of utility lines in accordance with claim 1 including positioning a first layer of utility lines in the trench on a layer of fill extending upwardly from a bottom of the trench about 6 inches, the first layer of utility lines including electrical utility lines and at least one of telephone utility lines, telecommunication utility lines and cable television lines, positioning about 12 inches of fill above the first set of utility lines and installing a warning tape and a second set of utility lines at a second utility line layer, providing about 12 inches of fill above the second utility line layer and positioning a third utility line layer on top of the layer of fill.

11. The method for installing a plurality of utility lines in accordance with claim 10 including positioning at least 24 inches of fill on top of the third utility line layer.

12. The method for installing a plurality of utility lines in accordance with claim 11 including positioning a warning tape intermediate the third utility line layer and a finish grade surface.

* * * * *